United States Patent [19]

Hagendoorn

[11] 4,118,206

[45] Oct. 3, 1978

[54] OIL MIST FILTERING APPARATUS AND METHOD

[75] Inventor: Willem Jacob Hagendoorn, Louisville, Ky.

[73] Assignee: Fisher-Klosterman, Inc., Louisville, Ky.

[21] Appl. No.: 748,322

[22] Filed: Dec. 7, 1976

Related U.S. Application Data

[63] Continuation of Ser. No. 506,442, Sep. 16, 1974, abandoned.

[51] Int. Cl.$^2$ .................... B01D 23/16; B01D 53/04
[52] U.S. Cl. ........................................ 55/74; 55/98; 55/186; 55/487; 210/23 R; 210/290; 210/DIG. 5
[58] Field of Search .............. 55/74, 97, 98, 185, 55/186, 187, 486, 512, 515; 210/23 R, 80, 282–284, 274, 286, 289, 290, 293, DIG. 5

[56] References Cited

U.S. PATENT DOCUMENTS

| | | | |
|---|---|---|---|
| 183,599 | 10/1876 | Sinclaire | 210/293 X |
| 273,539 | 3/1883 | Hyatt | 210/293 X |
| 1,864,755 | 6/1932 | Osmer et al. | 210/23 R X |
| 2,096,851 | 10/1937 | Fricke | 55/486 X |
| 2,789,695 | 4/1957 | Winkler et al. | 210/274 X |
| 2,789,696 | 4/1957 | Jahnig et al. | 210/274 X |
| 3,382,983 | 5/1968 | Stewart | 210/290 X |
| 3,617,548 | 11/1971 | Willihnganz | 210/23 R |
| 3,678,662 | 7/1972 | Grote | 55/486 X |
| 3,791,105 | 2/1974 | Rhodes | 55/512 R X |
| 3,853,753 | 12/1974 | Jones | 210/DIG. 5 |

Primary Examiner—Thomas G. Wyse
Assistant Examiner—Robert H. Spitzer

[57] ABSTRACT

A filtering device for cleansing oil mist from an effluent flow includes a hollow casing containing a filtering media of packed particulate solids and channel means projecting into the media adapted to conduct an effluent flow to the media and disperse it therethrough whereby oil mist particles are retained in the media while the cleansed flow is admitted to the atmosphere. The particulate solids of the filtering media are of a material having an affinity for attracting and retaining oil and the material is disposed in successive layers such that the effluent must pass through a bed of graduated density whereby the filtering efficiency is enhanced.

7 Claims, 3 Drawing Figures

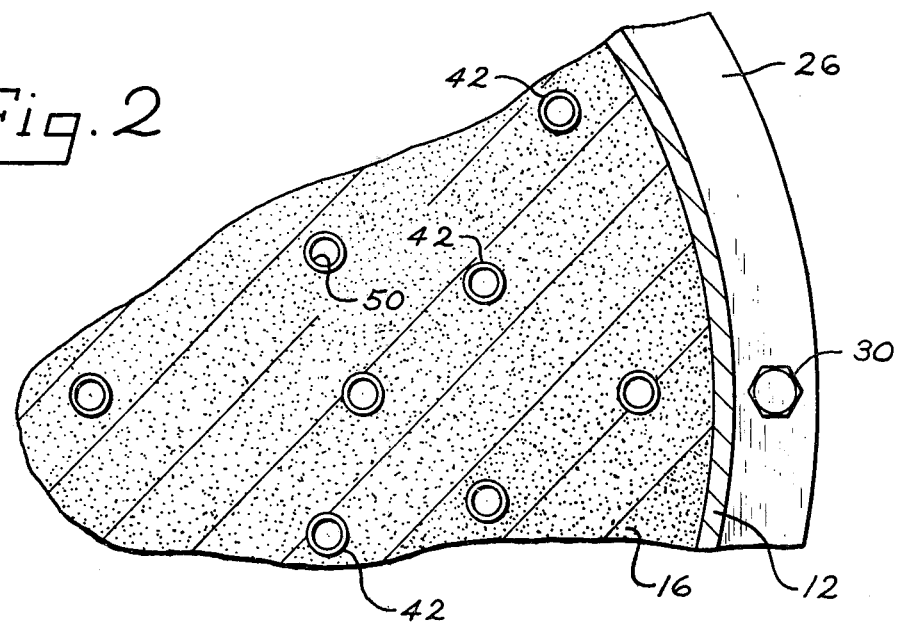
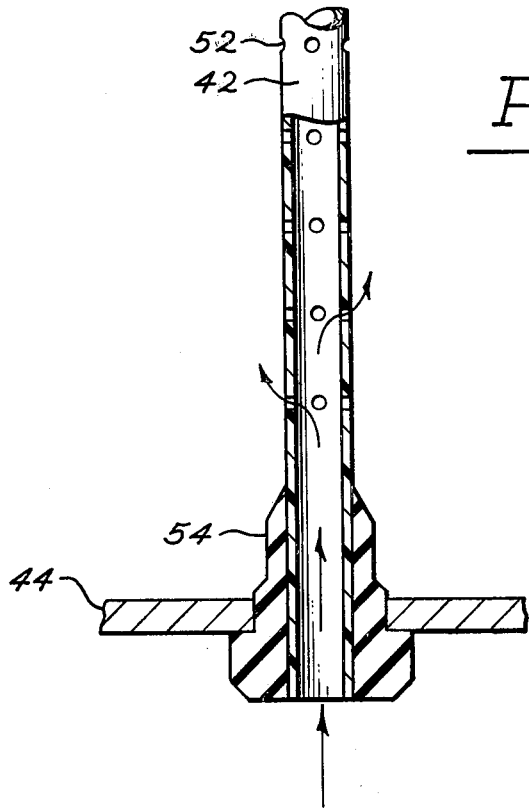

OIL MIST FILTERING APPARATUS AND METHOD

This is a continuation, of application Ser. No. 506,442, filed Sept. 16, 1974, now abandoned.

BACKGROUND OF THE INVENTION

There is a generally recognized requirement in industry to significantly reduce the ommission of pollutants into the atmosphere. The means with which such reduction is achieved must meet predetermined efficiency requirements and establish economic and safety limitations.

The present invention relates generally to the provision of pollution control equipment and pertains particularly to a method and apparatus for reducing the amount of oil carried in the air flow from a crankcase by directing such air flow through a filtering media whereby a substantial portion of the oil in the air flow is collected in the media so that the air is emitted to the atmosphere in a comparatively pollutant free condition.

A primary objective of the present invention is to provide a method and device for collecting oil mist from the air flow from a turbine crankcase through use of a device having no moving parts and utilizing an easily replaceable relatively inexpensive filtering or collecting media therein.

SUMMARY OF THE INVENTION

The present invention comprehends a filtering device for cleansing oil mist from an effluent flow by use of a hollow casing for retaining a filtering bed of packed particulate solids. A means is provided for directing oil-laden effluent to the media bed and dispersing it throughout the bed whereby a substantial part of the oil mist carried in the flow is retained in the bed and the cleansed flow is exhausted to the atmosphere. The casing and the filtering bed contained therein are oriented such that the effluent flow is directed upwardly therethrough by a channel means projecting into the media and preferable comprising a plurality of flow distributing conduits adapted to pass the effluent flow through the sidewalls thereof into the surrounding bed of particulate solids. The bed of particulate solids preferably comprises vertically-successive layers of successively increasing density. The device also preferably includes a means for draining collected oil from the bed whereby the useful filtering life of the bed is thereby extended.

BRIEF DESCRIPTION OF THE DRAWING

FIG. 2 is a fragmentary sectional view taken along lines 2—2 of FIG. 1; and

FIG. 3 is a view in comparatively enlarged scale of a tube or conduit element of the device shown in FIG. 1, having portions thereof cut away to reveal certain details of construction.

DETAILED DESCRIPTION OF THE PREFERRED EMBODIMENT

Figure 1:
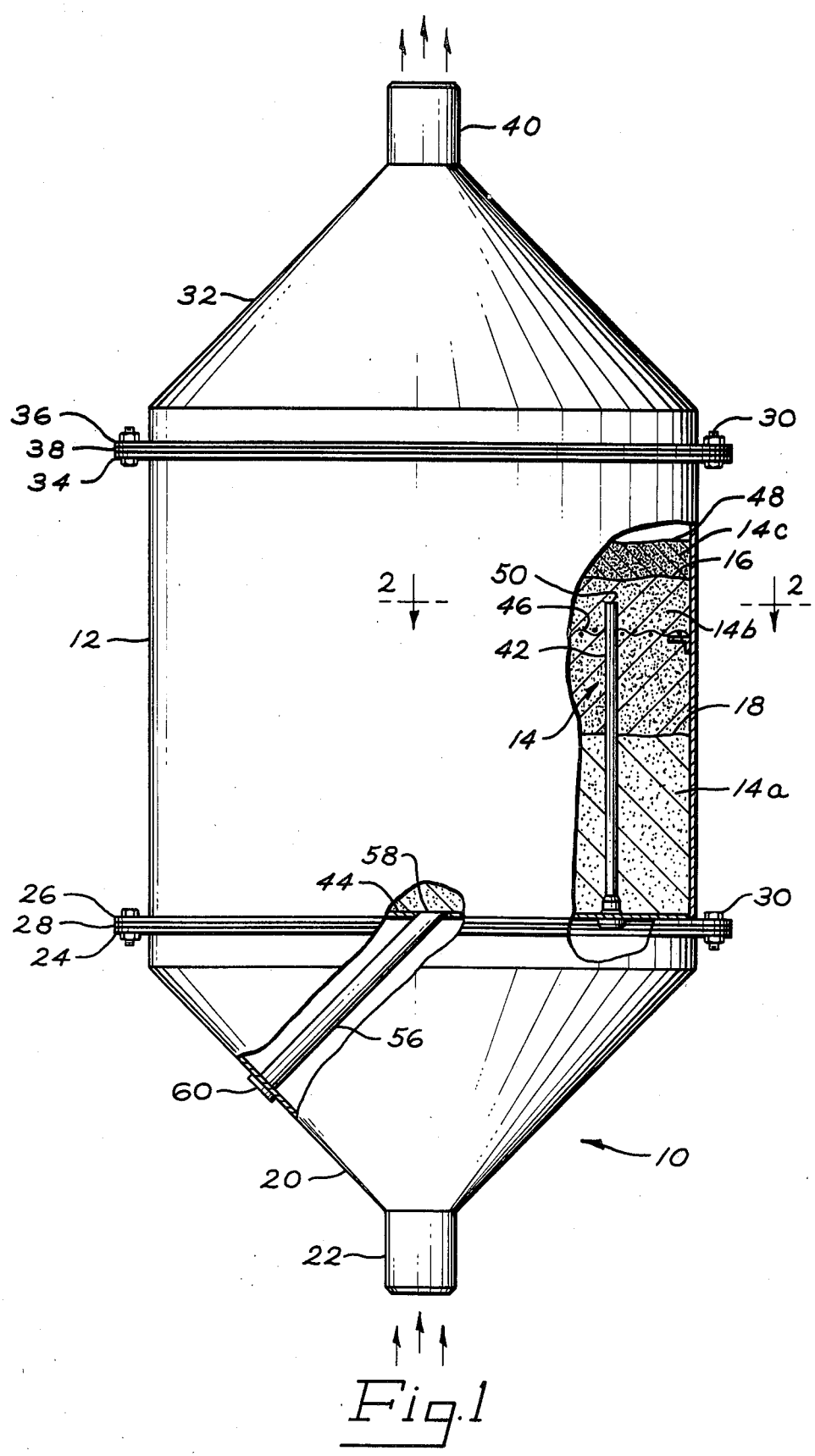
FIG. 1 is an elevational view of the presently preferred embodiment for an oil mist filtering device in accordance with the present invention.

In the presently preferred form, shown in FIG. 1, the invention comprises a filtering device or oil mist collector 10 comprising a substantially large central cylindrical section or hollow casing 12 containing therein a filtering media or bed 14 that is preferably a packed sand bed comprised of vertically successive stratum or layers wherein the lower layer 14a is of a relatively heavy grade or coarseness than the intermediate layer 14b, and the upper layer 14c is of the greatest density of the three layers. It will be noted that the upper layer 14c is packed against the middle layer or 14b generally at an interface line 16, and the middle layer 14b merges with the lower strata 14 at an interface line 18.

At the lower end of the hollow casing 12 is an effluent entrance conduit 20 for directing oil-laden effluent, received through an entrance nipple 22, upwardly toward the casing 12. The entrance nipple 22 may be conventionally threaded to receive a pipe connection (not shown) leading from the source of effluent or gaseous flow, such as the crankcase of a turbine. The conical or funnel-shaped entrance conduit 20 is provided with a flange 24 at its upper end adapted to sealably register with a complementary casing flange 26. A circular gasket 28 is provided between the flanges 24 and 26 to assure an air tight seal when fastening means such as bolts 30 are utilized to draw the flanges together.

At the upper end of the hollow casing 12, an exhaust conduit 32 is provided, similar in shape to the conduit 20, and it is similarly sealed in flow communication to casing 12 by means of complementary flanges 34 and 36 and a gasket 38. The upper end of the funnel-shaped conduit 32 terminates in an exhaust nipple 40 for directing cleansed effluent flow out of the device 10.

Contained within the hollow casing 12 and projecting into the packed sand bed media is an array of spaced-apart tubular members or vertically elongated tubes 42 which serve as a channel means for receiving oil laden #from the entrance conduit and dispersing it throughout the media within the casing 12. Support means for #tubes 42 is provided in the form of a floor plate 44 defining the bottom of the casing 12. The support means for the tubes 42 further comprises an upper support plate 46 which may be in the form of an open mesh screen to permit oil flow migration throughout the filtering media. The plate 46 may be provided with holes of a size to accommodate extension of the upper ends of the tubes 42 therethrough in a spaced-apart relation as generally shown in FIG. 2. The upper ends (50) of the tubes 42 terminate, below the top surface 48 of the media, and are preferably closed whereby all flow therefrom occurs as hereafter described.

The tube 42 shown in FIG. 3 is representative of all of the tubes in the plurality of such tubes projecting into the media as shown in FIG. 2 in accordance with the embodiment illustrated. Therefore, as illustrated in FIG. 3, each tube 42 is provided with a multiplicity of side wall openings 52 to permit passage of the gaseous oil-laden effluent from within the tube 42 and outwardly into the filtering media contained within the casing 12. Each tube 42 may be provided with suitable mounting means which may comprise a press fit rubber socket 54 at the lower end thereof to support the tube 42 on the plate 44 whereby the lower open end thereof is disposed to receive the oil mist effluent from the conduit 20 shown in FIG. 1.

The device 10 is also provided with means for periodically draining collected oil from the casing 12. As shown in FIG. 1, a drain tube 56 has an upper end 58 in flow communication with the lower end of casing 12, and a plugged lower end 60. The tube end 58 should be adapted to allow collected oil to flow downwardly through the tube 56 without permitting passage of the particulate material of the bed. This can be accomplished by use of a screen sieve (not shown) across the opening at the tube end 58.

In the present invention it is believed particularly important that the filtering bed be of graduated density and that the direction of effluent flow be established as described heretofore whereby the oil-laden air is directed first into the spaced-apart tubes 42, which may have a multiplicity of sidewall openings or be of a porous plastic material to permit flow diffusion into the bed. For optimum efficiency it has been determined that at least three layers of particulate solids are employed to provide layers of successively increasing density.

A unit utilizing the structure and flow characteristics herein described is particularly suitable for installation on a turbine crankcase at a natural gas pumping station because of its low maintenance requirements, absence of moving parts, and relative safety as compared to an electrostatic precipitator or similar more expensive and sophisticated devices. On such installation where the overall height of the filtering device 10 is 36 inches and the casing 12 is 30 inches in diameter, forty one-half inch diameter plastic tubes 42 are used for the channel means projecting into the filtering bed. Each tube may have porous walls to assure thorough diffusion of effluent flow. It is presently preferred that the filtering bed 14 have a layer 14a of coarse filling, preferably five to six inches in height in the casing 12, of $\frac{1}{8}$ polyvinyl chloride pellets. Then, the layer 14b is preferably about 10 inches of #3 sand (4–16 mesh) and the layer 14c is two to 3 inches of #2 sand (8–20 mesh). Alternatively, the lower layer 14a may be said of the next larger grade than #3 sand. By virtue of the upwardly step-by-step graduation of density of fill, a multiplicity of capillary-like interstices are found in each layer wherein fine oil droplet coalescence occurs, and the size of the interstices reduces upwardly in each successive layer. While the immediately preceding description is of a typical device utilizing the concepts of the present invention, it should be noted that other fill materials may also be employed, such as alumina or activated carbon, etc., and other layer mixture combinations may be desirable. Predetermined criteria such as optimum flow rate, acceptable pressure drop through the bed, and acceptable oil mist removal performance must be considered in selecting the type, amount and arrangement of particulate solids to be used in the filtering bed.

The foregoing description and accompanying drawings, which pertain primarily to the presently preferred embodiments of the present invention, are not intended to limit the invention since it will be obvious to those skilled in the art that various changes and modifications may be made without departing from the inventive concepts herein contained. It is therefore intended in the appended claims to cover all such changes and modifications that fall within the true spirit and scope of the invention.

I claim:

1. A filtering device for a turbine crankcase comprising a hollow casing having a lower-end entrance means for receiving gaseous effluent flow from the crankcase, an upper end exhaust means for delivering cleansed gaseous flow to the atmosphere, a particulate filtering media disposed in the casing between the entrance means and the exhaust means for separating and retaining oil mist from the flow, a floor plate extending transversely across the inside of the casing beneath the filtering media and adjacent the entrance means, a plurality of spaced-apart parallel tubes projecting upwardly into the filtering media from the floor plate, the lower end of each of the tubes being in sealed communication with a corresponding opening through the floor plate whereby the imcoming effluent flow will move upwardly past the floor plate solely by means of the tubes, the tubes permitting the effluent flow to progress therethrough and into the filtering media, drain means comprising at least a conduit extending generally downwardly from the floor plate and having its upper end in flow communication with the filtering media to receive and drain away liquid oil gravitating down through the filtering media and toward the floor plate, the conduit having a lower end extending to a drain discharge opening outside the casing such that liquid oil drained from the filtering media does not intermix with the incoming effluent flow from the crankcase.

2. The device of claim 1 wherein the filtering media comprises particulate solids established in vertically successive layers of graduated particle size, and the tubes have closed upper ends and a permeable wall structure enabling dispersion of the fluid flow from the tubes and throughout the filtering media.

3. The filtering device of claim 1 wherein the filtering media has at least an intermediate strata of the general equivalent of No. 3 sand, a relatively lower strata of packed particulate solids of a general uniform size that is substantially coarse as compared to No. 3 sand, and an upper strata of the general equivalent of No. 2 sand.

4. The filtering device of claim 3 wherein the tubes terminate below the upper strata of the fitering media whereby flow into the upper strata occurs only from the strata subjacent thereto.

5. A method of filtering oil particles from the vaporous flow emitted by a turbine crankcase comprising steps of:
   establishing a filtering bed of vertically successive layers of packed particulate solids,
   providing flow entrance means for directing the emitted vaporous flow generally upwardly through the bed,
   providing dispersal means for generally dispersing the flow whereby oil particles from the flow will coalesce throughout the bed,
   providing gravity flow means for draining collected oil away from the bed, including conduit means separate from the flow entrance means and dispersing means whereby intermixing of the emitted vaporous flow with collected oil is avoided,
   providing means at a point above the bed for exhausting the cleansed vaporous flow away from the bed and to the ambient atmosphere,
   utilizing a plurality of flow tubes disposed generally parallel in a spaced-apart relation in the bed to disperse the vaporous flow throughout the bed, and
   constructing the tubes from tubular material having micro-porous walls to provide improved flow dispersion throughout the bed.

6. The method of claim 5 further comprising the step of terminating the upper ends of the tubes within an intermediate layer of the bed whereby vapor flow above the flow in the intermediate layer is entirely through the bed.

7. The method of claim 5 comprising the further steps of establishing the filtering bed to include a bottom layer of polyvinylchloride cubes, a second layer disposed above the bottom layer comprising the general equivalent of #3 sand, and an upper layer disposed above the second layer comprising the general equivalent of #2 sand.

* * * * *